United States Patent [19]

Willdorf

[11] 3,949,134

[45] Apr. 6, 1976

[54] SOLAR CONTROL FILM FOR USE BY CONSUMERS AND THE LIKE

[75] Inventor: Michael E. Willdorf, Malden, Mass.

[73] Assignee: Material Distributors Corporation, Woburn, Mass.

[22] Filed: July 18, 1973

[21] Appl. No.: 380,485

[52] U.S. Cl. ............... 428/215; 156/99; 428/441; 428/458; 428/483
[51] Int. Cl.² .................. B32B 15/08; C09J 7/02
[58] Field of Search ............. 161/1, 4, 6, 167, 214, 161/216; 156/99; 428/215, 441, 458

[56] References Cited
UNITED STATES PATENTS

| | | | |
|---|---|---|---|
| 3,069,301 | 12/1962 | Buckley et al. ........................ | 156/99 |
| 3,290,203 | 12/1966 | Antonson et al. ..................... | 161/192 |
| 3,425,071 | 2/1969 | Frieder et al. ........................ | 161/214 |
| 3,775,226 | 11/1973 | Willdorf................................ | 161/1 |
| 3,776,805 | 12/1973 | Hansen................................ | 161/214 |

OTHER PUBLICATIONS

*The Condensed Chemical Dictionary*, 7th Edition, Arthur & Elizabeth Rose, p. 21, 1966.

Primary Examiner—Mayer Weinblatt
Assistant Examiner—Edith R. Buffalow
Attorney, Agent, or Firm—Morse, Altman, Oates & Bello

[57] ABSTRACT

A solar control film, for application to window glass by the consumer with minimum or no preparation, comprises a vapor deposited aluminum coat, which partially transmits light, interposed between a vinyl stratum and a polyester stratum, either of which contains an ultraviolet inhibitor and each of which is self supporting. This film is adhered by pressing the surface of its vinyl stratum against the window glass in either dry or wet condition.

16 Claims, 4 Drawing Figures

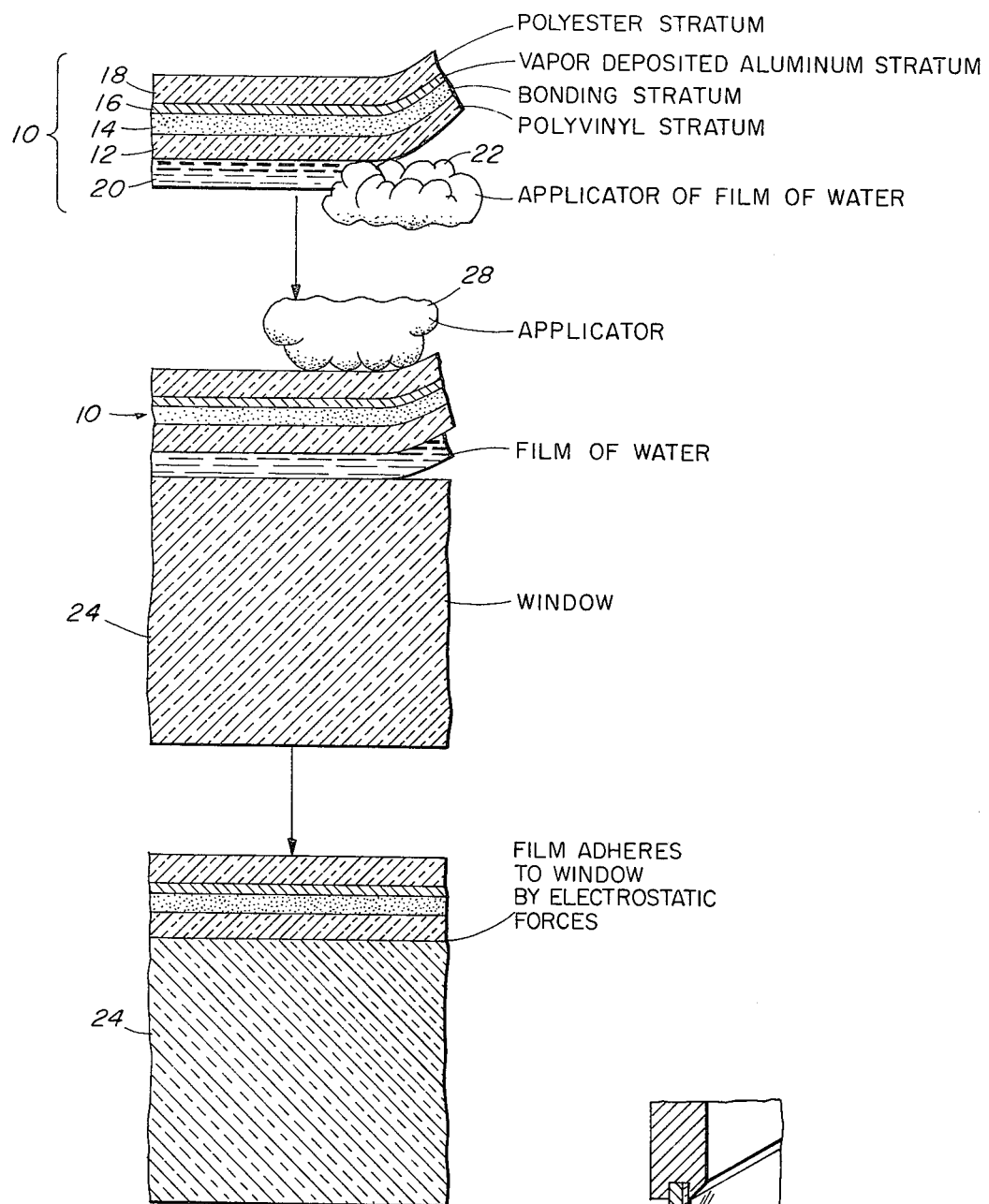
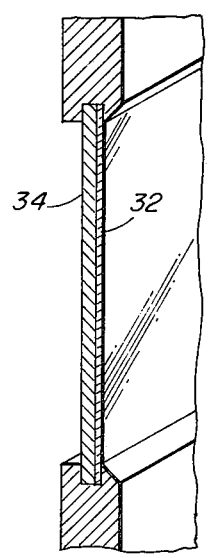
FIG. 1
FIG. 2

SOLAR CONTROL FILM FOR USE BY CONSUMERS AND THE LIKE

BACKGROUND AND SUMMARY

The present invention relates to a solar control film to be applied to windows of buildings and automobiles in order to reduce transmission therethrough of infrared, visible and ultraviolet radiation from the sun. Reduction of infrared transmission limits interior heating in the summer and interior cooling in the winter. Reduction of visible light transmission limits uncomfortable glare. And reduction of ultraviolet transmission limits fabric fading and finish cracking of furniture. Solar control film is intended to reflect solar infrared and ultraviolet and still to permit excellent visibility with minimum distortion. It has been found that 100 square feet of such film has a comparative cooling capacity equal to more than one ton of air conditioning. In effect this film is a two way thermal insulation that is partially transparent. Heretofore the use of such films has been by professionals primarily.

The primary object of the present invention is to provide a solar control assemblage, which is designed for use by the consumer in that it avoids the use of a chemical bonding stratum. Specifically this solar control film comprises a vapor deposited aluminum coat, which is of a thickness characterized by a light transmission of 5 to 50%, interposed between a polyvinyl stratum and a polyester stratum, each of which is self supporting and at least one of which contains an ultraviolet inhibitor. The two strata are laminated with the aluminum coat interposed. In one form this assemblage is part of a film having additional strata. It has been found that, when the polyvinyl face of the assemblage is pressed against a glass plate, whether or not wetted only with water, it adheres semi-permanently to provide a solar control film.

Other objects of the present invention will in part be obvious and will in part appear hereinafter.

The invention accordingly comprises the products and processes, together with their components, steps and interrelationships, which are exemplified in the accompanying disclsoure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein:

FIG. 1 is a flow diagram illustrating a solar control film, in exaggerated cross section, undergoing a process of the present invention;

FIG. 2 illustrates an architectural window incorporating the present invention;

DETAILED DESCRIPTION

Figure 3:
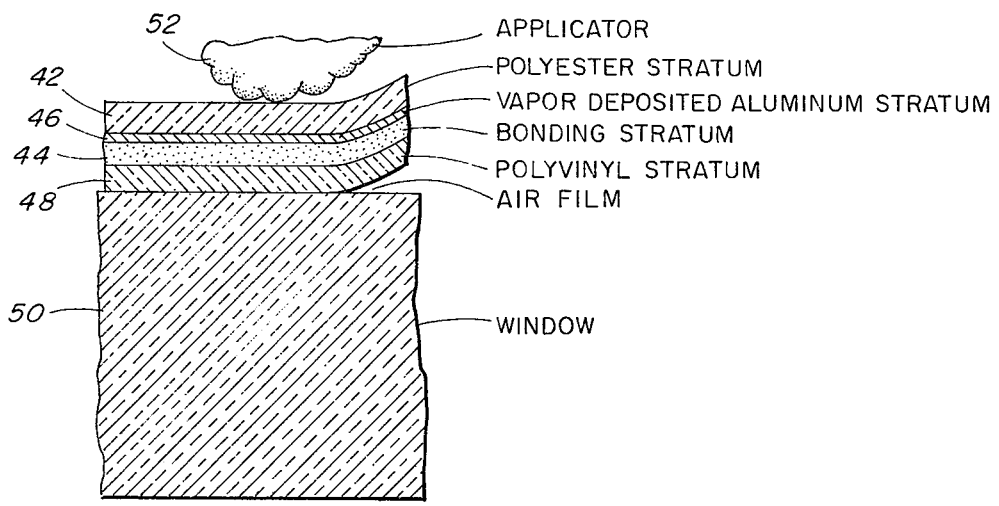
FIG. 3 illustrates the solar control film of FIG. 1, in exaggerated cross section, undergoing an alternative process of the present invention.

Generally, the solar control film 10 of FIG. 1 comprises, in laminated sequence, a moisture permeable polymeric stratum 12, a bonding stratum 14, a vapor deposited aluminum stratum 16, and a moisture permeable polymeric stratum 18. All of these strata except the aluminum stratum are optically clear and transparent. The aluminum stratum is optically clear and partially radiation transmitting, partially radiation absorbing and partially radiation reflecting. Typically: moisture permeable polymeric stratum 18 is composed of a polyester, for example a terephthalate polyester such as that sold under the trademark Mylar by Dupont; vapor deposited aluminum stratum 16 is produced by controlled density, vacuum vapor deposition upon the surface of polymeric stratum 18; adhesive bonding stratum 14 is coated upon either vapor deposited aluminum stratum 16 or polymeric stratum 12 as a thin film immediately before superposing the polymeric films and causing the adjacent surfaces to adhere; and polymeric stratum 12 is composed of a cast polyvinyl film, having a retained electrostatic charge, for example, such as that sold by Goodyear under the trademark Cast-Vinylfilm. Typically, polymeric stratum 18 ranges in thickness from ½ to 6 mils, preferably being approximately 2 mils, adhesive stratum 14 ranges in thickness from 0.0001 to 0.0003 inch, preferably being approximately 0.0002 inch, vapor deposited aluminum stratum 16 is characterized by a visible light transmission of 5% to 60%, having a thickness of no more than 300 angstrom units, and polymeric stratum 12 ranges in thickness from ¼ to 6 mils, preferably being approximately 2 mils. Adhesive stratum 14 is cast from a ketonic and/or alcoholic solution of a polyester, an acrylic ester, or a polyurethane, the solution preferably being applied to the clear film prior to superposing of the two polymeric films in the formation of the final product. For example, the polyester is a terephthalate polyester such as that sold by Dupont under the trademark Mylar, the acrylic ester is a methyl and/or ethyl methacrylate, the polyurethane is unsubstituted polyurethane, the ketone is methyl ethyl ketone and the alcohol is toluol. The resulting film has a pleasant, soft grey color that permits excellent visibility.

As shown in FIG. 1, the vinyl face of assemblage 10 is wetted with water 20, from a cloth 22 prior to application of solar control film 10 to a window 24. During superposition of the solar control film upon window 24, the water serves as a lubricant to permit smoothing of the film and elimination of air pockets between the film and the window by means of a cloth or squeegee 28. Following application of the film to the window, the water of the film diffuses through the film and the edges of the interface between the film and the window. In other words, preferably all of the strata of the film are selected for their vapor permeability. Following drying of the film of water, the film adheres to the window primarily by electrostatic forces. Nevertheless the film may be removed from the window simply by peeling.

As shown, vinyl stratum 12 is a weatherable, ultraviolet light absoring polymer effective in the range of from 200 to 380 nanometers, that does not darken or decompose upon prolonged exposure to intense ultraviolet. For example, such a polymer contains, as an ultraviolet absorbent, a dispersed substituted benzophenone of the type sold by Antara Chemicals under the trademark Uvinul. Preferably, vinyl stratum 12 is a polyvinyl chloride plasticized with an adipate plasticizer such as dioctyl adipate.

FIG. 2 illustrates the glass window 34, of a home or an automobile, the interior surface of which is adhered to a solar control film 32, of which a polyvinyl stratum is contiguous with and a polyester stratum is remote from window 34.

Generally, the solar control film of FIG. 3 comprises in laminated sequence, a mositure permeable polyester stratum 42, a bonding stratum 44, a vapor deposited aluminum stratum 46, and a mositure permeable polyvinyl stratum 48, all like their counterparts in FIG. 1. During superposition of the solar control film upon the window shown at 50, the film of air between the solar control film and the window serves as a lubricant to permit smoothing of the film and elimination of air pockets between the film and the window by a cloth of squeegee 52. Following application of the film to the window, the film is held against the window by electrostatic forces. Nevertheless the film may be removed from the window simply by peeling.

Figure 4:
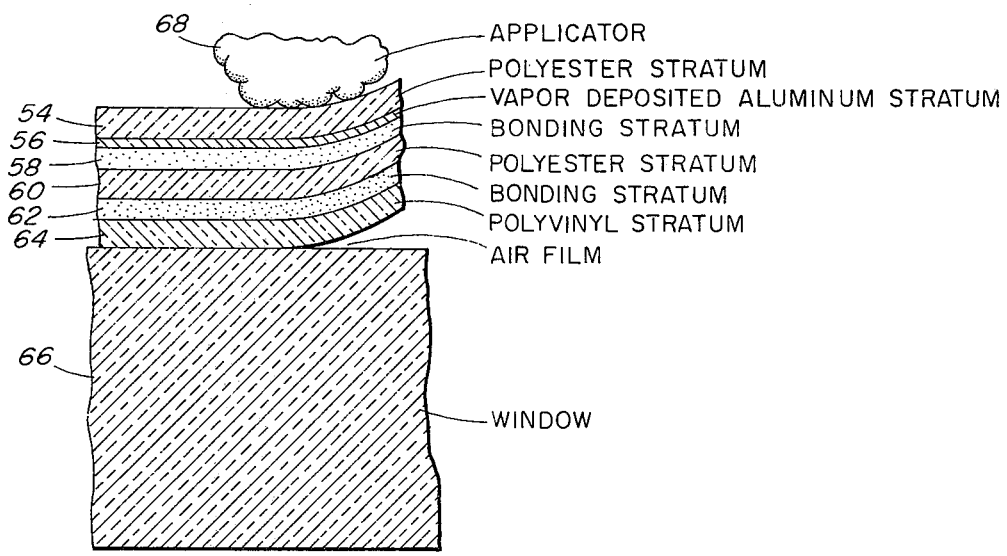
FIG. 4 is a modified solar control film of the present invention, in exaggerated cross section, undergoing a modified process of the present invention.

Generally, the solar control film of FIG. 4 comprises, in laminated sequence, a moisture permeable polyester stratum 54, a bonding stratum 58, a vapor deposited aluminum stratum 56, a mositure permeable polyester stratum 60, a bonding stratum 62, and a moisture permeable polyvinyl stratum 64. In the form shown, polyester strata 54 and 60 are of the same composition as stratum 18 of FIG. 1, bonding strata 58 and 62 are of the same composition and structure as stratum 14 of FIG. 1, vapor deposited aluminum stratum 56 is of the same composition and structure as stratum 16 of FIG. 1, and polyvinyl stratum 64 is of the same composition and structure as stratum 12 of FIG. 1. In this embodiment, strata 54 and 60 each ranges in thickness from ¼ to 3 mils. During superposition of this solar control film on a window 66 with its polyvinyl face contiguous with the window, a film of air or water between the polyvinyl face and the window serves as a lubricant to permit smoothing of the film against the window by a cloth or squeegee 68. Following application of the film to the window, the film is held against the window by electrostatic forces. Nevertheless the film may be removed from the window simply by peeling.

The present invention thus provides an improved solar control film that is less costly, can be more simply stored and transported, more easily applied to a window and more permanently used on interior or exterior window surfaces. Since certain changes may be made in the above disclosure without departing from the scope of the invention thereof, it is intended that all matters shown in the accompanying drawings or described in the foregoing specifications be interpreted in an illustrative and not in a limiting sense.

What is claimed is:

1. A flexible solar control film sheet for adherence to a glass window, said solar control film comprising:
    a. a polyester self-supporting stratum ranging in thickness from ¼ mil to 6 mils, said polyester self-supporting stratum being optically clear and transparent to visible light;
    b. a polyvinyl self-supporting stratum ranging in thickness from ¼ to 6 mils, said polyvinyl self-supporting stratum being optically clear and transparent to visible light;
    c. an inner bonding stratum between the adjacent faces of said polyester self-supporting stratum and said polyvinyl self-supporting stratum, said inner bonding stratum being composed of a polymer selected from the class consisting of polyesters acrylic esters, and polyurethanes;
    d. a vapor deposited aluminum stratum on the face of said self-supporting polyester stratum, said vapor deposited aluminum stratum having a thickness of no more than 300 angstrom units and a visible light transmission ranging from 5% to 60%; and
    e. the outer face of said polyvinyl self-supporting stratum, having an electrostatic charge by which it serves as a bonding stratum;
    f. said polyester self-supporting stratum, said polyvinyl self-supporting stratum, said inner bonding stratum, and said vapor deposited aluminum stratum being moisture permeable;
    g. at least one of said polyester stratum and said polyvinyl stratum containing an ultraviolet light absorbing material effective in the range of 200 to 380 nanometers;
    h. said inner bonding stratum ranging in thickness from 0.0001 to 0.0003 inch.

2. The solar control film sheet of claim 1 wherein said polyvinyl self supporting stratum is composed of a polyvinyl chloride with an adipate plasticizer.

3. The solar control film sheet of claim 1 wherein said polyester self supporting stratum is composed of a terephthalate.

4. The solar control film sheet of claim 1 wherein at least one of said polyvinyl stratum and said polyester stratum contains a color imparting dye.

5. A flexible solar control film sheet for adherence to a glass window, said solar control film comprising:
    a. a polyester self-supporting stratum ranging in thickness from ¼ mil to 6 mils, said polyester self-supporting stratum being optically clear and transparent to visible light;
    b. a polyvinyl self-supporting stratum ranging in thickness from ¼ to 6 mils, said polyvinyl chloride self-supporting stratum being optically clear and transparent to visible light;
    c. an inner bonding stratum between the adjacent faces of said polyester self-supporting stratum and said polyvinyl self-supporting stratum;
    d. a vapor deposited aluminum stratum on the face of said self-supporting polyester stratum, said vapor deposited aluminum stratum having a thickness of no more than 300 angstrom units and a visible light transmission ranging from 5% to 60%;
    e. the outer face of said self-supporting polyvinyl stratum, having an electrostatic charge by which it serves as a bonding stratum;
    f. said polyester self-supporting stratum, said polyvinyl self-supporting stratum, said inner bonding stratum, and said vapor deposited aluminum stratum being moisture permeable;
    g. at least one of said polyester stratum and said polyvinyl stratum containing an ultraviolet light absorbing material effective in the range of 200 to 380 nanometers; and
    h. said inner bonding stratum ranging in thickness from 0.0001 to 0.0003 inch.

6. The solar control film sheet of claim 5 wherein said polyvinyl chloride self supporting stratum contains an adipate plasticizer.

7. The solar control film sheet of claim 5 wherein said polyester self supporting stratum is composed of a terephthalate.

8. The solar control film sheet of claim 5 wherein at least one of said polyvinyl stratum and said polyester stratum contains a color imparting dye.

9. A flexible solar control sheet for adherence to a glass window, said solar control sheet comprising:
    a. at least one polyester self supporting stratum ranging in thickness from ¼ mil to 6 mils, said polyester self supporting stratum being optically clear and transparent to visible light;

b. a polyvinyl self supporting stratum ranging in thickness from ¼ to 6 mils, said polyvinyl self supporting stratum being optically clear and transparent to visible light;

c. at least one inner bonding stratum between adjacent faces of the self supporting strata of said solar control sheet, said inner bonding stratum being composed of a polymer selected from the class consisting of polyester, acrylic ester, and polyurethane compositions; and d. a vapor deposited aluminum stratum on the face of said self supporting polyester stratum, said vapor deposited aluminum stratum having a thickness of no more than 300 angstrom units and a visible light transmission ranging from 5% to 60%;

e. the outer face of said polyvinyl self supporting stratum having electrostatic characteristics by which it serves as a bonding stratum;

f. said polyester self supporting stratum, said polyvinyl self supporting stratum, said inner bonding stratum, and said vapor deposited aluminum stratum being moisture permeable;

g. at least one of the strata of said solar control sheet containing an ultraviolet light absorbing material effective in the range of 200 to 380 nanometers.

10. The solar control sheet of claim 9 wherein said polyvinyl self supporting stratum is composed of polyvinyl chloride.

11. The solar control sheet of claim 9 wherein said polyvinyl self supporting stratum is composed of polyvinyl chloride with an adipate plasticizer.

12. The solar control sheet of claim 9 wherein said polyester self supporting stratum is composed of a terephthalate.

13. The solar control sheet of claim 9 wherein said polyester self supporting stratum is composed of polyethylene terephthalate.

14. The solar control sheet of claim 9 wherein at least one of its strata contains a color imparting dye.

15. The solar control sheet of claim 9 wherein there is a single polyester self supporting stratum.

16. The solar control sheet of claim 9 wherein there are a plurality of polyester self supporting strata.

* * * * *